United States Patent Office 2,820,083
Patented Jan. 14, 1958

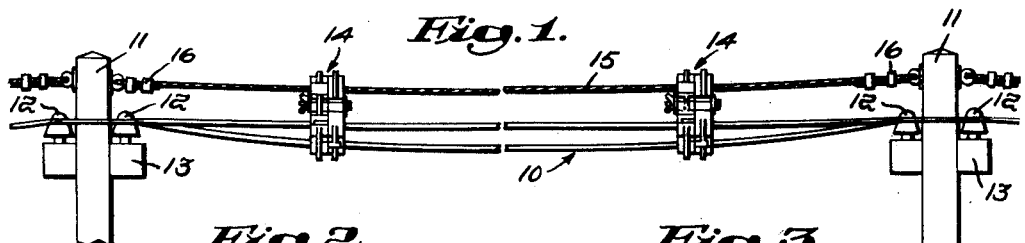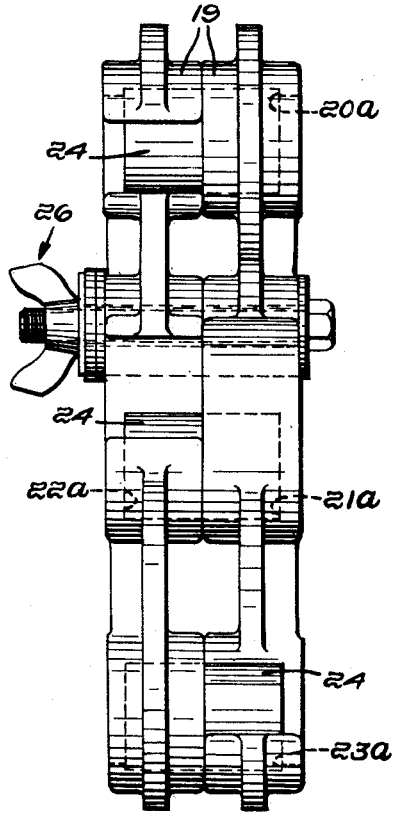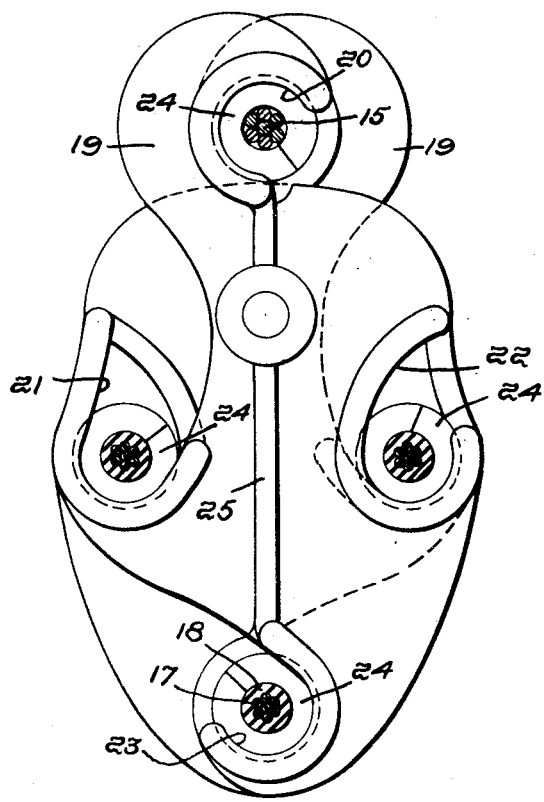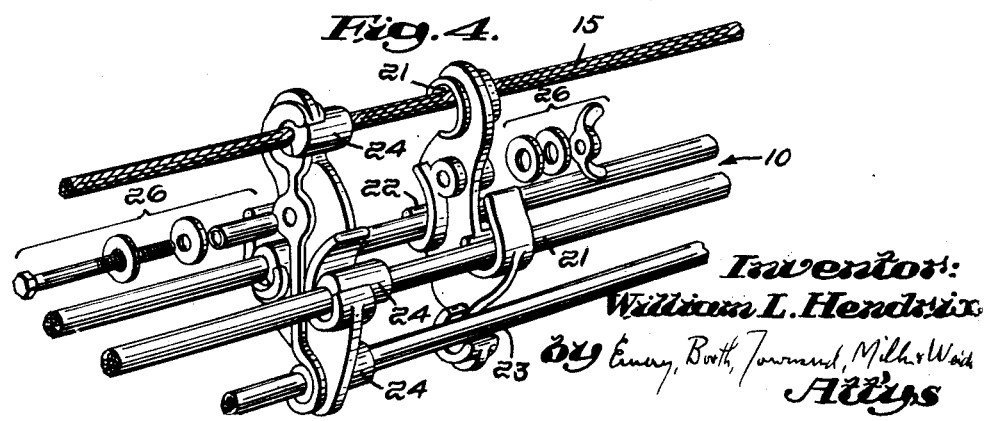

2,820,083

AERIAL CABLE

William L. Hendrix, Brighton, Mass.

Application June 2, 1955, Serial No. 512,600

8 Claims. (Cl. 174—43)

This application relates generally to electric power transmission and more particularly to aerial cables such as employed in distribution and feeder circuits and comprising a plurality of insulated conductors and means for their aerial support and connection. The invention aims generally to improve such power transmission by the provision of an aerial cable novelly affording self-support, positive positioning, and insulative spacing of the cable wires. The invention aims further to provide an aerial cable distinguished by an improved lightly insulated conductor. The invention provides more specifically novel hanger-spacer clamp means ordering the cable wires for reduction of their insulation and also of their spacing vertically of the pole or other conductor support. The still further objects and advantages of the invention include the use of longer spans; easy, certain identification of circuit phase; the elimination of shielding; increased circuit capacity, and generally the construction, installation, maintenance of aerial cables with much greater ease, safety, and economy than heretofore.

An aerial cable of the new and improved type to which this application relates, and upon which my present invention improves, is shown and comprised in my copending application Serial No. 250,003, filed Oct. 5, 1951.

The invention will be clearly and more fully understood from the following specification taken in conjunction with the accompanying drawing in which:

Fig. 1 shows a pole mounted cable span;
Fig. 2 is an end elevation of the cable clamp;
Fig. 3 is a side view of the same; and
Fig. 4 is an exploded view in perspective of a cable of the invention and showing the clamp in an intermediate stage of assembly with the cable wires.

The transmission of electric power, first along open wires, is now generally through heavily insulated conductors. These insulated conductors were initially developed for installation underground, as in urban areas. They have since and more widely been employed in aerial cables which provide close aerial support and spacing of a conductor plurality.

In conventional aerial cable constructions the heavily insulated wires are either supported in a parallel group or bundle and in closely spaced rings or hangers suspended from a messenger, or they are wound or spun along and onto the messenger in a continuous helix. The wire group or bundle may be loosely held, or it may be variously bound or compacted.

This wire bundling or winding requires heavy shielding and wrapping of the conductors, and thus substantially increases the cost of construction, installation, and maintenance of the cable. More particularly, it greatly increases cable weight, with resultant decrease in span lengths and increase in pole requirements. Moreover, special equipment and specially trained personnel are required for maintenance of these shielded power cables.

The present invention provides an improved aerial cable in which insulating clamps are installed at regular intervals along the cable length intermediate the poles, which clamps are employed to position and space the "hot" conductors, and to support them from the messenger. The wires of my improved cable are thus installed on and spaced between full voltage insulators throughout the circuit length, and do not require shielding. In other words, the improved conductor construction permitted and provided by the invention is characterized by only such insulation as is necessary for sound voltage breakdown protection.

In the preferred embodiment herein disclosed, the cable conductors are provided more particularly with a special insulating covering of greatly reduced weight and thickness, but having unusual mechanical, electrical, and chemical strength, and also requiring no protective covering over the same.

The aerial installation of power lines is governed by utility conditions specifying a minimum permissible pole spacing between transmission lines and between the conductors and ground. It will be appreciated that the spacing of the cable conductors in accordance with the invention and vertically of the pole may, as where the cables are installed in conjunction with telephone wires, secondary wires and the like, require a height exceeding the standard size pole, and thus necessitate the costlier installation of outsized poles. Accordingly, the invention clamp is specially and novelly formed in the present embodiment to provide lateral, and thereby to reduce vertical spacing of the conductors.

My novel clamp as herein embodied is of triangular construction, whereby the conductors are ordered in lateral-vertical pattern, and with each conductor center equidistant from the other two. Those skilled in the art will appreciate that may improved triangular, equal spacing clamp is adapted further to minimize inductance, and improve voltage regulation; and that as voltage loss is a percentage drop, the same is advantageously employed particularly on lower voltage circuits, where the drop of a few volts may be important.

A representative installation of my novel aerial cable is shown in Fig. 1 wherein a single span of three phase conductors 10 is shown as supported between poles 11 and more particularly passed over insulators 12 mounted on cross arms 13. The conductors 10 are seen as supported intermediate the poles 11 by the clamps 14 which are in turn suspended from the messenger 15 tied at its ends to pole clamps 16.

In accordance with the invention the conductors 10 comprise a plurality of conductive strands 17 and in combination therewith a light, thin, insulating covering 18. This insulating covering 18 is characterized further as tough mechanically, chemically, and electrically, and distinguished still further as an integral flexible continuous sleeve member which uniformly centers and tightly seals the conductors, which may be cleanly and freely stripped from the wires, and which requires no protective covering.

I preferably employ for the insulation vinyl plastic, which has been found to combine the described properties and which is conveniently provided in the form of a tape which may be wrapped or wound on long conductor lengths and in one or more layers and then heat-sealed to form a closed endless unitary tube highly resistant to sun and rain and to extremes of heat and cold and the like weather and wear conditions.

The improved conductors 10 of my novel aerial cable are supported, positioned, and spaced in the unique insulating clamps 14 now to be described. These hanger-spacer clamps 14 are shown more particularly to comprise each a pair of duplicate identical plates 19 formed of a material selected for low or light weight, and also for high mechanical, electrical and chemical strength. I prefer to employ the materials known commonly as "Lucite" and "Plexiglas," and found to combine these desired characteristics. The plates 19 are provided each with an upper, downfacing recess 20 for hooking over the messenger 15 and with intermediate and lower recesses or sockets 21, 22, 23 for receiving and supporting the conductors 10.

Further in accordance with the invention, the sockets 20—23 are constructed such that when the plates 19 are oppositely or reversely faced, and abutted side to opposite side with their juxtaposed sockets transversely aligned, the plate recesses co-operate to define continuous clamp seats or bearings which completely enclose and lock about the messenger and conductor wires. To this end the herein upfacing plate recesses 20—23 are characterized by non-vertical or lateral entrant formations, whereby when the plates are so reversed and abutted the adjacent or interconnected recesses have the bearing wall of one axially-circumferentially opposed to and continuous with the entrant opening of the other, as best shown in Fig. 3. This is seen to require the orienting of the non-vertical entrant formations of the side conductor recesses 21, 22 oppositely with respect to the plate vertical centerline, the one being inclined inwardly toward said centerline, the other being inclined outwardly away from the same.

My novel aerial cable clamp is characterized further and in the present embodiment in that the conductor sockets 21, 22, 23 are equidistant and define more particularly an equilateral triangle, with the lowermost socket 23 vertical with messenger recess 20, and with intermediate sockets 21, 22 arranged laterally of the plate and spaced equally from the said recess 20 as well as from the lower socket 23. The clamp is thus given desired symmetry of design, as well as greatly reduced vertical extent, as heretofore mentioned.

The clamp plates 19 and more particularly the sockets thereof are fashioned in a thickness providing the needed strength of support and spacing between and stability of engagement over the cable wires. Significant weight savings are achieved by fashioning the plates generally and in their non-wire-contacting portions of minimum thickness consistent with desired rigidity. In the "Plexiglas" embodiment herein illustrated the plate may be molded for example in a general thickness of as little as ¼ in. Further, the socket bearing walls are extended at both sides of the plates and to a length of, say, 1 in. for desired stability of engagement about the cable wires. It may here be noted that the extended transverse walls of the recesses 20—23 are conveniently molded in the similar thickness as the above mentioned non-wire-contacting, recess bounding and connecting plate portion, and that the peripheral contouring of both is desirably selected not only for minimum clamp weight, but also for rain washout of dust and the like accumulation tending to "leak" when wet. Thus and as herein shown the clamp is characterized further by inclined, non-straight exposed surfaces curving generally complementary to the bearing recesses and so as to shelter or screen the same against the aforementioned accumulation.

The engagement of the clamp plates is seen more particularly to be about rubber or other insulating, split-ring filler bushings 24, Figs. 3 and 4, which co-operate with the sockets for locking retention of the cable wires. The bushings 24 are seen more particularly to be radially proportioned for snug reception in the sockets, and to extend axially for interfitting and spanning a juxtaposed pair thereof, Fig. 3, as hereinafter more fully explained.

In assembling the clamp, one of the plates 19 is first installed by hooking its upper, downwardly inclined recess 20 over the messenger 15. The conductors 10 are then hooked over and dropped into place in the sockets 21, 22, 23. The other of the clamp plates 19 is reversed or faced oppositely of the said one plate and then installed on the cable with its sockets 20—23 similarly hooked over and under the wires 10, 15, Fig. 4. The desired reversed facing of the plates 19 may be facilitated by providing the same with a side differentiating rib 25 or the like which may additionally serve to strengthen the plate, and to provide a convenient area for indicia.

The bushings 24 are then placed on the messenger and conductors 10, 15 and the plates 19 are drawn together or closed over the same, and with their juxtaposed recesses 20—23 in parallel, continuous, end abutted relation, Figs. 1 and 2. The clamp plates may be releasably fastened in this assembled or operating, wire supporting and spacing position by any suitable means, as for example by the nut, bolt, washer and collar assembly herein indicated generally at 26, Fig. 4, and which is preferably fashioned of aluminum or the like rigid, light weight, durable insulating material.

In the assembled position of the clamps 14 the adjacent or juxtaposed sockets 20—23 of the plates 19 are seen to define unitary bearings or seats for the cable wires and more particularly for the filler bushings 24. In accordance with the invention, the bushings are locked against both sidewise and endwise removal from these wire bearings or seats. Thus the entrant formations on the plate recesses, while admitting the conductors 10 as above mentioned, are seen to be too small to pass the bushings 24. Further, the wire seats are partially closed at their ends, as by means of infacing bearing wall flanges or lips 20a—23a at one end of each of the plate recesses 20—23, Fig. 2, whereby the bushings 25 are secured against escape endwise of the clamp. Finally, the non-vertical or varying orientation of the plate recesses has been shown to define clamp sockets or bearings which, when considered axially of the cable or as interlocked with the bushings 25, are seen to project full circle or so as to completely surround and enclose the said bushings, and with the entrant formation of the one opposed by or axially-circumferentially continuous with the bearing surface of the other of each adjacent or juxtaposed recess pair.

From the foregoing it will be appreciated that numerous important advantages are derived from the novel features and characteristics of my improved aerial cable. Those skilled in the art will readily appreciate that material, installation and maintenance cost savings of fifty percent and more are had. For the greatly reduced weights involved permit longer spans, which may extend up to, say, 350 feet without overloading the pole plant with too high messenger tensions. Moreover, the cable is simpler to install, splice, terminate and tap, and shielding tape trouble is eliminated, the cable being worked "hot" without additional equipment or specially trained help. My improved cable is seen still further to permit easy positive phase identification, as the conductors are held in the same relative position at all points.

The cable of the invention is importantly characterized also by higher current capacity; there is better heat dissipation because the conductors are spaced, and there is no dielectric loss as with shielded conductors. The triangular clamp herein disclosed is seen also to provide better voltage regulation through insuring desired positioning and equilateral spacing such as affords minimum inductance.

It will be understood that my invention is not limited to the particular embodiments thereof illustrated or described herein, and I set forth its scope in my following claims.

I claim:

1. An aerial cable clamp comprising an assembly of identical insulating hanger-spacer plates each thickened and recessed to define an upper hook and equidistant side and lower sockets respectively for the messenger and the conductors of a power line, said plates aligned and abutted side-to-opposite-side, the hooks and seats juxtaposed in said assembly having walls and openings oppositely engaging and exposing and thereby locking about said messenger and conductors.

2. An aerial electric power cable comprising a supporting messenger, a set of lightly insulated electrical conductors, and longitudinally distributed hanger-spacer clamps comprising each a pair of similar rigid insulating plates having messenger and conductor sockets defined by bearing walls and entrant openings, the conductor sockets spaced equidistantly from each other, said plates in operative position being aligned and abutted side-to-opposite-side and with their juxtaposed sockets oriented such that the bearing wall of one is opposite to the entrant opening of the other, said sockets thereby together defining locking enclosures for the messenger and conductors, and means for releasably fastening the plates in said operative position.

3. A clamp for an aerial electric power cable having a messenger and conductors comprising a pair of identical insulating hanger-spacer plates formed each with a hook for engagement over the messenger and equilaterally spaced sockets for supporting the conductors, said hook and sockets defined by bearing walls and entrant openings, said plates aligned and abutted side-to-opposite-side with their hooks and seats juxtaposed endwise, and insulating bushings interfitting said juxtaposed hooks and sockets, said bushings spanning said walls and larger than said openings and thereby cooperating with said hooks and sockets for locking retention of said messenger and conductors.

4. An aerial electric power cable comprising a supporting messenger, a set of lightly insulated electrical conductors, and longitudinally distributed hanger-spacer clamps comprising each a pair of similar insulating plates, each said plate formed with an upper recess engaging over the messenger and side and lower recesses seating and positioning the conductors in equilaterally spaced array, the plates aligned and abutted side-to-opposite-side and with their juxtaposed recesses oppositely engaging and together locking about said messenger and conductors.

5. An aerial electric power cable comprising a supporting messenger, a set of lightly insulated conductors, and longitudinally distributed hanger-spacer clamps having each a pair of identical plates, said plates applied oppositely to said cable and closed to side abutted relation, and formed each with an upper recess hooked over said messenger and equidistant side and lower recesses seating said conductors, the juxtaposed recesses of said plates oriented variously of and together completely enclosing said messenger and conductors, and insulating bushings spanning said juxtaposed recesses.

6. An aerial cable according to claim 5 and end flanges on said juxtaposed recesses, said flanges overlying endwise and preventing axial escape of said bushings.

7. An aerial cable according to claim 5 and means for releasably fastening said plates in said abutted relation.

8. A clamp for an aerial electric power cable having a messenger and conductors comprising a pair of identical insulating hanger-spacer plates formed each with an inclined hook for engagement over the messenger and inclined equilaterally spaced sockets for supporting the conductors, said plates aligned and abutted in side-to-opposite-side assembly and with said hooks and sockets juxtaposed endwise, filler bushings interfitting and locked against removal from the juxtaposed hooks and sockets and for retaining therein said messenger and conductors, and means for releasably fastening said plates in said assembly.

References Cited in the file of this patent
UNITED STATES PATENTS

| | | |
|---|---|---|
| 289,164 | Strohm | Nov. 27, 1883 |
| 289,165 | Strohm | Nov. 27, 1883 |
| 2,231,462 | Cobb | Feb. 11, 1941 |